US 8,572,715 B2

(12) United States Patent
Koeppen et al.

(10) Patent No.: US 8,572,715 B2
(45) Date of Patent: Oct. 29, 2013

(54) METHOD FOR USE IN A NETWORK BASED SAFETY DATA STORAGE SYSTEM

(75) Inventors: Siegfried Koeppen, Koenigs-Wusterhausen (DE); Stefan Loewe, Berlin (DE)

(73) Assignee: Deutsche Telekom AG, Bonn (DE)

( * ) Notice: Subject to any disclaimer, the term of this patent is extended or adjusted under 35 U.S.C. 154(b) by 2196 days.

(21) Appl. No.: 10/563,337

(22) PCT Filed: Jun. 17, 2004

(86) PCT No.: PCT/DE2004/001252
§ 371 (c)(1),
(2), (4) Date: Jan. 3, 2006

(87) PCT Pub. No.: WO2005/003933
PCT Pub. Date: Jan. 13, 2005

(65) Prior Publication Data
US 2006/0200676 A1     Sep. 7, 2006

(30) Foreign Application Priority Data
Jul. 1, 2003   (DE) .................................. 103 29 779

(51) Int. Cl.
*H04L 29/06*     (2006.01)
(52) U.S. Cl.
USPC ............ 726/10; 713/155; 713/156; 713/175; 709/213; 709/217
(58) Field of Classification Search
USPC ............ 713/155, 156, 175; 726/10; 709/213, 709/217
See application file for complete search history.

(56) References Cited

U.S. PATENT DOCUMENTS

| | | | |
|---|---|---|---|
| 5,901,227 A * | 5/1999 | Perlman ....................... | 713/157 |
| 2003/0174842 A1* | 9/2003 | Challener ..................... | 380/277 |
| 2004/0010715 A1* | 1/2004 | Winiger et al. ............... | 713/201 |
| 2004/0054750 A1* | 3/2004 | de Jong et al. ................ | 709/217 |

FOREIGN PATENT DOCUMENTS

WO    WO 00/51034    8/2000

OTHER PUBLICATIONS

CryptoHeaven, Secure Email, Online Storage, File Sharing; http://www.cryptoheaven.com; downloaded from the Internet Dec. 29, 2005; 2 pages.
bigVAULT, Storage Technologies; http://www.bigvault.com; downloaded from the Internet Dec. 29, 2005; 2 pages.
Globedesk.com:Login; http://www.globedesk.com; downloaded from the Internet Dec. 29, 2005; 1 page.

\* cited by examiner

*Primary Examiner* — Nathan Flynn
*Assistant Examiner* — Sarah Su
(74) *Attorney, Agent, or Firm* — Leydig, Voit & Mayer, Ltd.

(57) ABSTRACT

In a method for use in a data storage system which applies high safety requirements for the storage of data on a server in a telecommunications network and for the retrieval of the files by the local computers linked with the server via the network, the applicant is provided with a user certificate and public and secret keys, preferably on a chip card. Once the server is dialed up via the Internet, a client program is forwarded to the user which controls authentication of the user and the transmission of additional safety-relevant features of proof such as biometrical systems, geographical positioning, time-dependent data, network and computer data, etc., to the server. The storage system on the server is provided with a locker-type characteristic by establishing folders comprising a specific file for the safety requirements related thereto. The lockers are distinguished by their specific function and are only displayed to the user when the safety requirements are met. This locker system thus also has virtual character.

15 Claims, 3 Drawing Sheets

METHOD FOR USE IN A NETWORK BASED SAFETY DATA STORAGE SYSTEM

The present invention relates to the field of security for access and data storage on servers operating in free-access networks.

BACKGROUND

There are a number of applications for the security and provision of data, for example, over the Internet, whose specific features are described below.

The application Cryptoheaven (see the cryptoheaven.com website) is a Java application (applet/Java plug-in). Similarly to MS Explorer, the display is divided, on the left, into a directory tree (incl. the local computer) and a contact list. Settings can be made via the right mouse button/popup. A proprietary protocol via port 82 is used. Data compression is used. Files are signed and encrypted. Files can also be uploaded from the local file system using drag and drop (DnD). The sequence control substantially corresponds to that of MS Explorer. The encryption is done locally on the client computer. Directories can be created, deleted and renamed. Access to directories is enabled for "invited users". The invitation is made via e-mail by users who have subscribed to the system. The invited must give his/her consent. Authentication is via user ID and password. The system is available for the operating systems Windows/Unix and Linux.

Another typical application exists in bvPREMIERE, bvPRO, bvPLUS+ and big VAULT Enterprise (see the bigvault.com website). The applications are specifically for Windows and allow a drive to be mapped (created) in MS Explorer, which is controlled via the WEB. The transmission protocol for uploading and downloading files is html over an SSL connection. File encryption is done on the server. Access to directories and files is enabled using a visitor password. There is an in-tray for authorized users. It is possible to log in as a user or visitor. Passwords with a limited validity period are set up in the same manner as has been done, for example, in UNIX for many years.

A further application offering an online file service for uploading/downloading is GLOBEDESK (see the globedesk.com website). Uploading/downloading via the browser is done using html or ftp. The connection is secured by SSL. Encryption is done on the server. The names of the subscribers are listed in a directory. A click on a name establishes connection to the available directories. User identification is done using e-mail and name.

The examples given are characterized by the following features:
  Security is based on a model using user name and password. Once a user has authenticated with his/her name and the associated password, the system is available to the user always in the same manner.
  The data is stored in a file system, or such that the functionality of a file system is exactly emulated for the user (such as mailboxes in Webmail).

SUMMARY OF THE INVENTION

With respect to security and to the storage system, the known applications have the following disadvantages:
  A security model based on user name and password can only implement the states access authorization granted or access authorization revoked. Finer control, for example, using time limits or intervals to be observed for access, is not possible.
  The storage model used is characterized as a registry of created folders, in which files are stored regardless of their type, and retrieved again. A freely selected classification or restriction by predefined filed types is not possible.

An object of the present invention is to provide a method for access and data storage in telecommunications networks which overcomes the disadvantages of the known applications and provides increased security.

The method is characterized in that it allows dependencies, such as the whereabouts, access time, terminal attributes, quality of communication paths, authentication method, etc., to be taken into account for the access rights, and in that it allows a security configuration according to the locker principle to be emulated for the data storage. The security is further enhanced by carrying out the encryption and decryption of files on the local computer of the user and by using an additional second encryption algorithm on the server, said second encryption algorithm being unable to be influenced by the user.

The aim of the data transfer is to store data in memories of servers in order to restore the data to the local computer when needed, to have the data processed on a remote computer, or to make the data available to third parties or to the user himself/herself at a different location for a certain period of time. The conditions under which access is allowed are able to be precisely controlled and maintained. The storage of files requires a classification system which should provide clarity for the retrieval of files and optimally support data security.

The present invention provides precise access control and a classification system for the storage of the files featuring high security. The data storage system includes the server and its special program operating in a telecommunications network as well as the local computers integrated over the network. The program on the server uses a storage model in the form of a locker system. The locker system has a virtual character because, depending on the access rights, only the lockers and files the user is authorized to access are displayed to the user. No information is provided to the user when access is denied. Instead, the lockers, sub-locker, and files for which the user is not authorized are not displayed to the user.

In order to access the server and use the programs, an authorization is required, said authorization being granted by the server operator. An application for this is available, for example, upon written request or via the Internet. The application must include all information required for the issuance of a user certificate. The certificate contains, inter alia, the public key of the user. The user has a secret key for this public key. Preferably, the secret key and the certificate are stored on a smart card, because in this way a high level of protection is achieved for the secret key. If this option is chosen, the user is provided with a second pair of keys to allow the user to use the system without the smart card, if required. In this second pair of keys, the secret key is protected by a password selected by the user.

In order to identify the user, personal data is entered into a database along with a copy of the certificate. The server accesses this information to be able authenticate users and to provide a user directory accessible by all users. In particular, each user has a unique system name, which may differ from his/her natural name.

DETAILED DESCRIPTION

During registration, the server operator creates a personal area of the server for the user, said personal area being called the main folder of the user. Operating systems and databases store data and their management information in different ways. Here, the known model of folders (also: directories) and files is used for purposes of description. A file (containing the data) is always contained in a folder, which is either the so-called root folder, or is itself contained in a folder. Thus, starting from this folder, the root folder is reached via a chain of higher-level folders. The names of the folders in this chain are strung together to form the so-called path of the file. A file is uniquely described by its name and path.

In the data storage system described herein, each folder contains a special file containing security and management information for the server (Table 1). In the following, a "locker" is taken to mean the unit including the folder and the special file.

Figure 3:
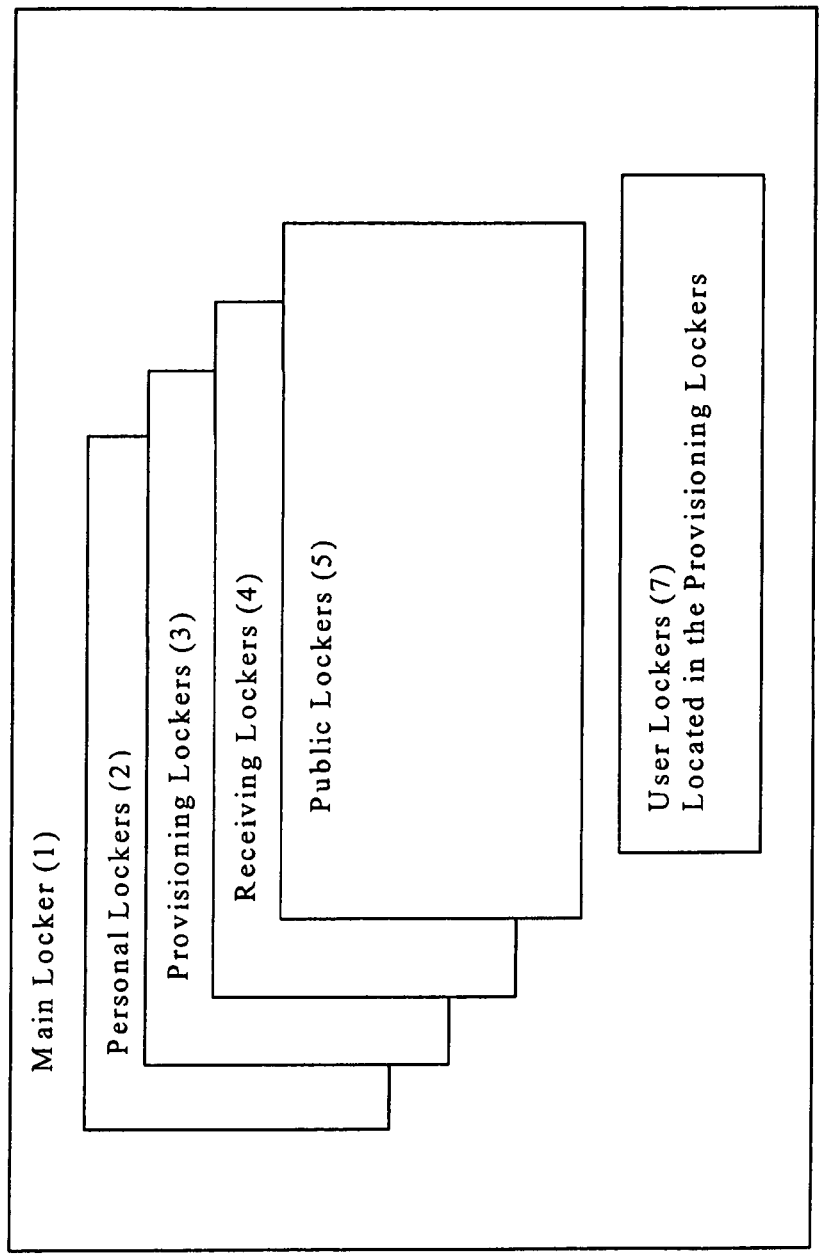
FIG. 3 shows a locker system according to method a for data storage on a server in a telecommunications network.

FIG. 3 illustrates the locker system. The main locker (1) (main folder and special file) contains further lockers which are set up by the operator and distinguished by function. These lockers include, inter alia, personal lockers (2), provisioning lockers (3), receiving lockers (4), and public lockers (5) for the users. The locker type is specified in the associated special file.

A reference to a file contains at least the name of the file to which it refers.

Figure 1:
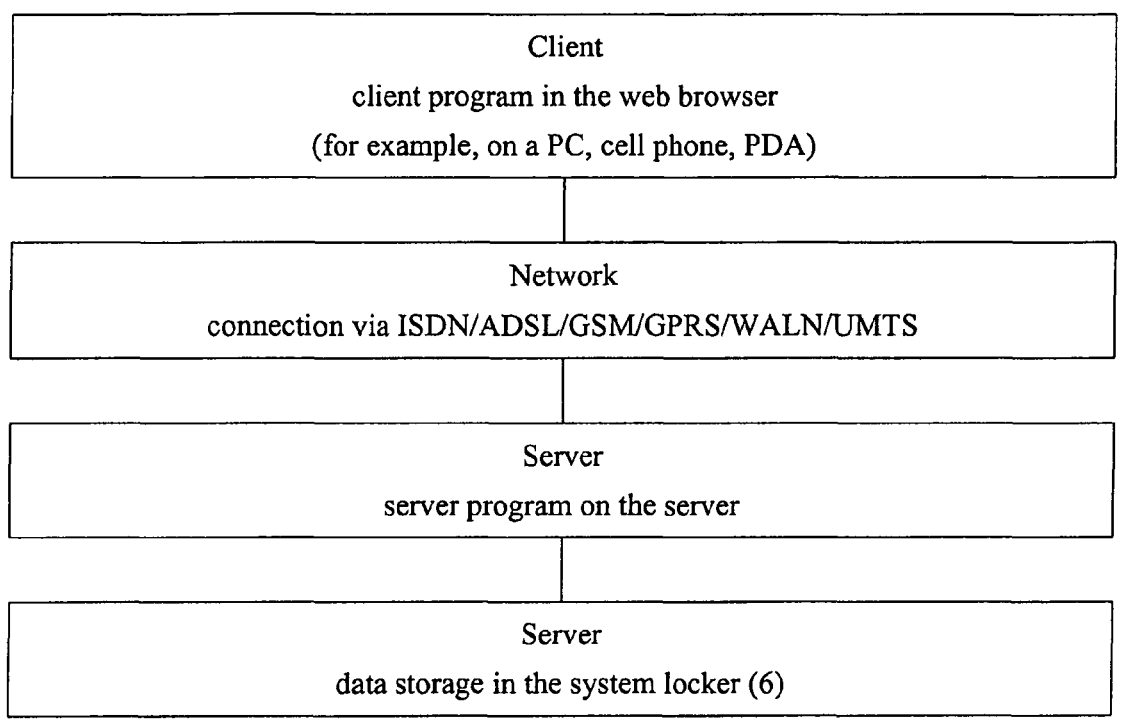
FIG. 1 shows the structure of server and client programs according to a method for data storage on a server in a telecommunications network.

Personal lockers contain only user-stored references to the files of the user; the transferred files themselves are stored by the server in the system folder, or locker, (6), which can only be accessed by the server (FIG. 1). Provisioning lockers are used by the user to store therein the references to his/her files for other users. Receiving lockers contain references offered to the user by other users, and public lockers contain references to files offered to all users. The user is able to set up sub-lockers in each locker of any of the types mentioned above, and to store references in these sub-lockers. Said sub-lockers may, in turn, contain other sub-lockers.

Access to the server is established from the local computer by connecting to the Internet address of the server. In this manner, the server obtains the Internet address of the local computer. As a rule, the network operator connecting the local computer to the Internet uniquely identifies the access point (ISDN or ADSL connection, GSM, GPRS, WLAN, UMTS). In order for the server to receive this information, a contract may be required to exist between the network operator and the operator of the data security system, and the network operator must provide the technical facilities.

The structure of the server and client programs is illustrated in FIG. 1. The server sends a special program, the so-called client program, to the local computer. It is also possible to install a client program on the local computer and to make the connection from the local computer. The client program connects itself to some of the systems existing on the local computer, for example, a smart card reader, a fingerprint scanner, a face recognition system, a GPS module, or a system configured to determine (or to approximately determine) the geographic location.

The client program allows the user to use the functions made available to him/her on the server side, and to enter the data required for executing the programs, provided he/she can successfully authenticate to the server. Depending on the type of components present (card reader, biometric system), the client program offers the user different ways of authentication (name/password, PIN, smart card, smart card with biometry). The method chosen, the authentication result, and the geographic data (if available) are transmitted to the server. If the authentication fails, the server disconnects the connection, and the client program is terminated. If successful, the user can chose whether he/she wishes to act as a normal user (default condition) or as an administrator. In the second case, the client program may request a new, high-quality authentication, such as via smart card and biometry.

The period of time from the authentication to the termination of the client program is referred to as session. Successful authentication in particular causes the system name of the user to be associated with the session. This makes it possible to separate a great number of sessions running in parallel, and allows the server and client program to control the rights of user to execute applications. The information transmitted by the client program, such as type of authentication (name/PW, smart card, . . . ) and geographic location, as well as the starting time known to the server, the current time, and the address (Internet address or network operator identification) of the local computer form also part of the session data and are stored by the server.

The client program displays to the user the contents of his/her main locker and local file system in the form of a folder tree as known from Microsoft Explorer; the operation also being similar to that of the Explorer. In each instance, the system displays only the lockers and references for which the user is authorized in the current session. Authorization is verified by the server by comparing the data contained in the special file to the session data.

The lockers are represented by a specific graphical symbol to distinguish them from ordinary folders. If the user has administrator rights, the locker symbols are given a special color.

The special file of a locker is at no time visible, nor is it possible to make it visible. If the user is the administrator, then, upon request, the client program displays to him/her the (user-) changeable content of special file, allowing him/her to change entries.

The system locker is at no time visible. This property cannot be changed either, because the user has no direct or indirect access to the special file of the system locker.

Figure 2:
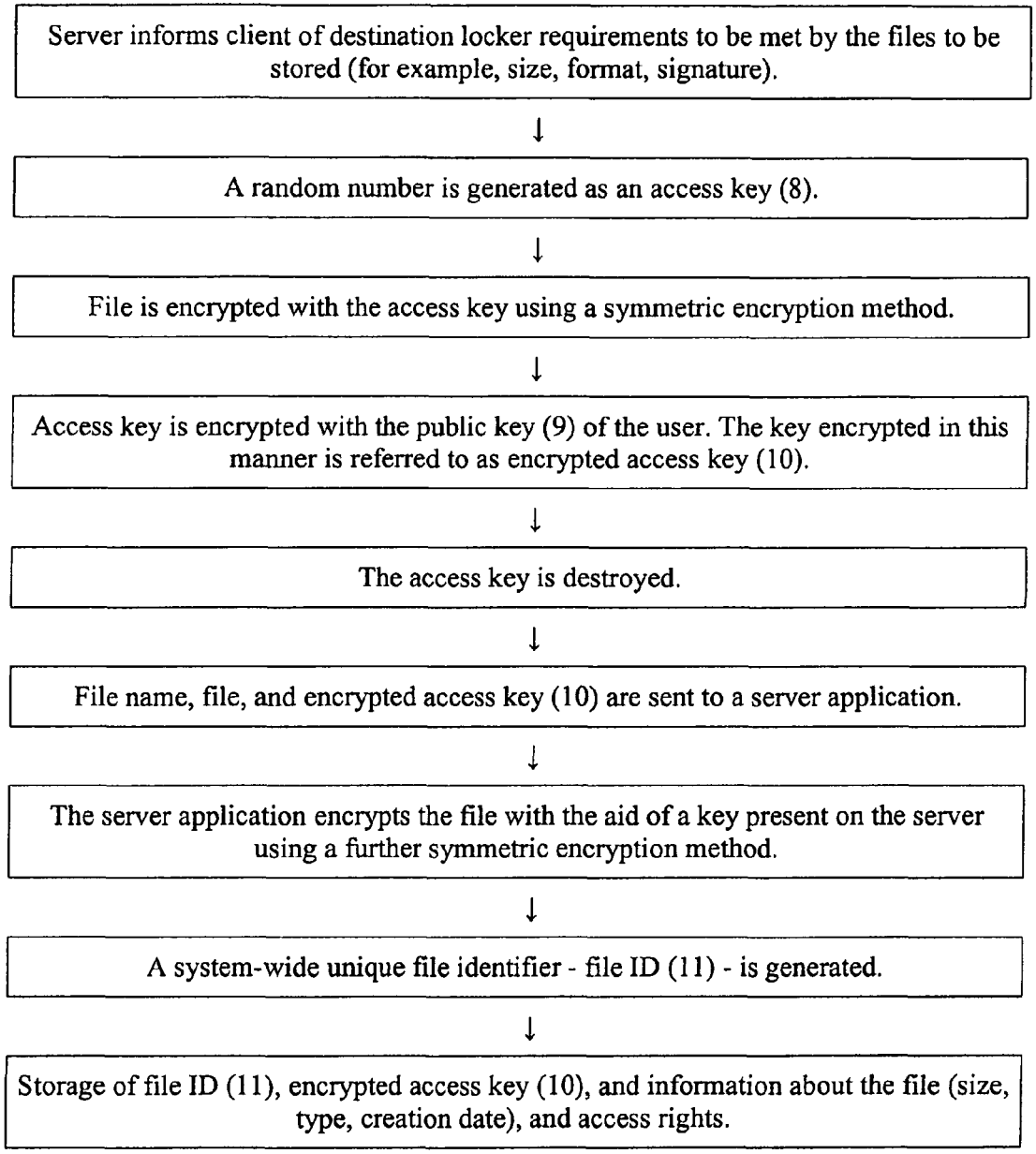
FIG. 2 shows the steps for encrypting a file to be stored according to a method for data storage on a server in a telecommunications network.

Storing a file located on the local computer into the personal locker of the user is a multi-step process, which is carried out by the user using a program having one component in the client program and one component on the server. The user interface of the client program allows the user to select the file to be stored by path and name and to specify the destination path in his/her personal locker. The steps for encrypting a file to be stored are illustrated in FIG. 2. The server informs the client program of the destination locker requirements to be met by the files to be stored. These requirements include the maximum size, specific format (doc, pdf), or the existence of a signature of the data. If the requirements are met, the client program loads the data contained in the file and generates a random number, the so-called access key (8), with which the data is encrypted using a symmetric encryption method. Subsequently, this access key is encrypted with the public user key to form the encrypted access key (9), and the access key is destroyed. In this manner, it is achieved that the encrypted content of the file can be decrypted only by the user who is able to recover the access key with the aid of his/her secret key.

The file name, file type, file size, encrypted data, and the encrypted access key are sent to the program portion on the server side along with further data required according to Table 2. The program portion on the server side encrypts the data a second time using a symmetric key of its own, so that even theft of the data, of the encrypted access key, or of the secret user key would not allow access to the data. Then, said program portion generates a system-wide unique file identifier, which is used as an internal name for the encrypted data. The encrypted data is stored under this name in the system locker. Then, a reference is created in the destination folder, said reference including the name of the file as the file name and containing the file identifier, the encrypted access key, and information about the file (size, type).

If the user, as the owner of a file, wants to offer this file to another user, he/she acts as an administrator and sets up a user locker (7) for the other user in a provisioning locker, as shown in FIG. 3. For this purpose, the server offers the user, via the client program, a user directory which is in the manner of a telephone book and from which the user selects the desired user as the addressee. The user can also set up a personal locker for a group of users. The server enters this user or these users into the properties file as co-owners of the locker.

Via the user interface of the client program, the owner informs the server of the file to be offered and its destination (a sub-locker set up by the owner) within the user locker. The client program sends this information to the server. The server checks whether the properties of the destination locker permit the desired operation, after which it sends a copy of the reference to the file back to the client program along with the public key of the addressee. The client program extracts the encrypted access key from the reference, prompts the user to restore the access key using his/her secret key, and then encrypts it with the public key of the addressee to form a new encrypted access key. The access key is destroyed, the new encrypted access key is entered into the reference, and the reference is returned to the server which stores it in the destination locker. Then, a locker having the name of the owner is created in a receiving locker of the addressee.

Thus, the user now has a reference to the file along with a personal access key encrypted access key.

When the user opens a receiving locker, he/she sees lockers denoted by the names of offerors. When the user opens such a locker X of an offeror (by clicking on the icon in the display of his/her client program), the server searches the provisioning lockers of the offeror for user lockers that were set up by the offeror for the user, and selects therefrom the user lockers that the user is allowed to access under the current session data. The server sends these names to the client program, which displays them as sub-lockers of X. Thus, the user lockers are not actually contained in X, which, however, is not noticeable by the user.

The references offered (offered files are visible to the user) are reported by the server to the client program only if the conditions specified in the reference are not violated by any session datum.

From the description, it becomes clear that a user sees a reference in his/her client program only if the reference contains an encrypted access key that is encrypted with the public key of the user. Using his/her secret key and the encrypted access key, the user can restore the access key of the file and decrypt the encrypted data.

TABLE 1

| special folder file | | | | | |
|---|---|---|---|---|---|
| File information: Access data: | Owner | File name | Creation date | Data type/Path | Signature |
| Right to "access" co-user 1: | location a ... location z | time a ... time z | authentication a ... authentication z | IP address a ... IP address z | network type a ... network type z |
| Right to "access" co-user n: | | | | | |
| Upper limits: | individual file size | total file size | number of sub-lockers | | |
| Limitations: | file types | signatures | | | |

TABLE 2

| | reference |
|---|---|
| Definition: | system-created file; representative of a file in the system locker |
| Data fields: | identifier of the referenced file; encrypted encryption key; type of file; size of file; file creation time; reference creation time; time of last access. |
| Security information: | owner; restriction authentication |

What is claimed is:

1. A method for data storage on a server in a telecommunications network, the telecommunications network providing connectivity between local computers of users and the server, the method comprising:

issuing, upon request, by an operator of the server, to a first user of the users a user certificate for access conditions;

providing the user certificate and a secret key to the first user;

accessing the server over an internet;

sending, by the server, a client program to a first local computer of the first user, the client program enabling an authentication of the first user using the user certificate and a transmission of at least one further security requirement;

setting up a personal main folder on the server for the first user, the main folder having a first special file including a first security requirement defined for the main folder and first management information so as to provide a main locker;

configuring the personal main folder to have at least one further folder set up therein, the at least one further folder having a function and a second file including a second security requirement defined for the least one further folder and including second management information so as to provide a functional locker;

displaying the functional locker only if at least one security-relevant requirement is met so as to provide a locker system having a virtual character, wherein the functional locker provides a personal locker, wherein a reference to first files of the first user is storable in the personal locker only by the first user and displayable only to the first user, and at least one of:
  a provisioning locker, wherein a first reference to a different second file available to another user is storable therein only by the first user; and
  a receiving locker, wherein a third file of a second user of the users is storable therein only by the second user, the receiving locker being configured, when opened, to provide to the first user a sender user reference relating to the storage of the third file and to a sender user defined security requirement.

2. The method as recited in claim 1 wherein the certificate includes a public key.

3. The method as recited in claim 1 further comprising providing a public key to the first user.

4. The method as recited in claim 1 wherein the providing the user certificate and the secret key to the first user is performed by providing the user certificate and the secret key on a smart card.

5. The method as recited in claim 1 wherein the at least one further security requirement includes at least one of a biometric system requirement, a geographic positioning requirement, a time restriction, a network requirement, and a computer data requirement.

6. The method as recited in claim 5 wherein the at least one further security requirement includes a time dependency.

7. The method as recited in claim 1 wherein the at least one further security requirement is a requirement of at least one of the operator of the server, the first user, and a sender of the third file.

8. The method as recited in claim 1 wherein the provisioning locker has a name associated therewith.

9. The method as recited in claim 1 wherein the provisioning locker includes a user locker for the another user.

10. The method as recited in claim 1 wherein the receiving locker has a name associated with a sender of the third file.

11. The method as recited in claim 1 wherein the receiving locker includes a user locker for the sender user.

12. The method as recited in claim 1 wherein the first user and the second user are each registered with the server, and further including the steps of:
  setting up a second personal main folder on the server for the second user, the second main folder having a respective first special file including a respective first security requirement defined for the respective main folder and respective management information so as to provide a respective locker,
  configuring each respective main folder to have respective further folders set up therein, the respective further folders each having a respective function and each having a respective second file including a respective second security requirement defined for the respective further folders and including the respective management information, each of the further folders acting as a respective functional locker,
  displaying each functional locker only if a respective security-relevant requirement is met, so as to provide a respective locker system having a virtual character, each functional locker providing a respective function of at least one of:
    a respective personal locker, respective first files being storable in the respective personal locker only by the respective user and displayable only to the respective user;
    a respective provisioning locker, wherein a respective first reference to a respective second file for a different user being storable by the respective user therein;
    a respective receiving locker for a respective third file available to a respective sender user of the users, the respective receiving locker being configured, when opened, to provide to the respective user a respective sender user reference relating to the storage of the respective third file and to a respective sender user defined security requirement; and
    a respective public locker configured to store, by the first user, the first reference to the second file when the first reference is stored in the provisioning locker, if access to the first reference is offered to a plurality of different users.

13. The method as recited in claim 1 further including the steps of:
  storing a fourth file in the functional locker only if the second security requirement is met;
  generating a random number from data of the fourth file so as to provide an access key;
  encrypting the data using the access key;
  subsequently encrypting the access key with a public key and then destroying the access key so that the access key, for accessing the stored file, can only be recovered using the secret key;
  receiving, at the server, the encrypted data, a fourth management information of the fourth file, and the encrypted access key;
  encrypting, by the server, the transmitted encrypted data a second time;
  generating a unique file identifier for the fourth file;
  storing the fourth file in a system locker using the unique file identifier; and
  storing a fourth reference to the fourth file in the functional locker, the fourth reference including the unique file identifier, the encrypted access key, and the fourth management information.

14. The method as recited in claim 13 wherein the functional locker is the provisioning locker including a user file for the other user, and further including the steps of:
  enabling the stored fourth file to be forwarded by the first user to the other user only if the first user decrypts the encrypted access key with the secret key and re-encrypts the decrypted access key with a second public key of the other user, and
  storing the re-encrypted access key, the file unique identifier and the fourth management information, as the fourth reference to the file into the user locker.

15. The method as recited in claim 13, wherein the second management information includes a management requirement, and wherein the storing the fourth file is performed only if the management requirement is met.

* * * * *